United States Patent
Shimura et al.

(10) Patent No.: US 10,138,871 B2
(45) Date of Patent: Nov. 27, 2018

(54) AIRFLOW GENERATION DEVICE AND WIND POWER GENERATION SYSTEM

(71) Applicant: KABUSHIKI KAISHA TOSHIBA, Minato-ku (JP)

(72) Inventors: Naohiko Shimura, Atsugi (JP); Motofumi Tanaka, Yokohama (JP); Toshiki Osako, Kawasaki (JP); Tadayoshi Hanafusa, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 350 days.

(21) Appl. No.: 14/885,277

(22) Filed: Oct. 16, 2015

(65) Prior Publication Data
US 2016/0131108 A1    May 12, 2016

(30) Foreign Application Priority Data

Nov. 6, 2014  (JP) ................................. 2014-226218
Jul. 21, 2015  (JP) ................................. 2015-143783

(51) Int. Cl.
*F03D 7/02* (2006.01)
*F03D 1/06* (2006.01)
(Continued)

(52) U.S. Cl.
CPC ......... *F03D 7/0276* (2013.01); *F03D 1/0633* (2013.01); *F03D 1/0675* (2013.01);
(Continued)

(58) Field of Classification Search
CPC ........ F03D 7/022; F03D 7/042; F03D 1/0675; F03D 7/0276; F03D 7/0296; F03D 17/00; F03D 1/0633
See application file for complete search history.

(56) References Cited

U.S. PATENT DOCUMENTS 7,585,275 B2   9/2009  Kubota et al.
8,523,115 B2*  9/2013  Essenhigh ............ B64C 23/005
                                                         244/205
(Continued)

FOREIGN PATENT DOCUMENTS

CN    103899477 A     7/2014
EP    2 522 859 A2    11/2012
(Continued)

OTHER PUBLICATIONS

Extended Search Report dated Mar. 29, 2016 in European Patent Application No. 15189582.8.

*Primary Examiner* — Jason Shanske
*Assistant Examiner* — Behnoush Haghighian
(74) *Attorney, Agent, or Firm* — Oblon, McClelland, Maier & Neustadt, L.L.P.

(57) ABSTRACT

There is provided an airflow generation device and the like capable of suppressing an increase in a number of poles of a slip ring, and effectively preventing a malfunction from occurring due to a generation of noise caused by the slip ring. An airflow generation device of an embodiment has a main body, a rotation speed detecting unit, and a voltage application unit. The main body has a first electrode and a second electrode provided to a base formed of a dielectric, and is disposed on a rotary body. The rotation speed detecting unit detects a rotation speed of the rotary body. The voltage application unit generates an airflow by applying a voltage between the first electrode and the second electrode based on the rotation speed detected in the rotation speed detecting unit. Here, the voltage application unit and the rotation speed detecting unit are disposed in the rotary body.

8 Claims, 7 Drawing Sheets

(51) Int. Cl.
*F03D 17/00* (2016.01)
*F03D 7/04* (2006.01)

(52) U.S. Cl.
CPC ........... *F03D 7/022* (2013.01); *F03D 7/0296* (2013.01); *F03D 7/042* (2013.01); *F03D 17/00* (2016.05); *F05B 2260/96* (2013.01); *F05B 2270/327* (2013.01); *Y02E 10/721* (2013.01); *Y02E 10/723* (2013.01)

(56) References Cited

U.S. PATENT DOCUMENTS

| | | | |
|---|---|---|---|
| 2012/0267892 A1* | 10/2012 | Matsuda | F03D 7/022 290/44 |
| 2012/0280501 A1* | 11/2012 | Tanaka | F03D 7/022 290/44 |
| 2012/0287550 A1 | 11/2012 | Tanaka et al. | |
| 2013/0076036 A1* | 3/2013 | Liu | F03D 7/00 290/44 |
| 2015/0110651 A1 | 4/2015 | Tanaka et al. | |

FOREIGN PATENT DOCUMENTS

| | | |
|---|---|---|
| JP | 2006-197986 | 8/2006 |
| JP | 2008-025434 | 2/2008 |
| JP | 2012-255432 | 12/2012 |

\* cited by examiner

AIRFLOW GENERATION DEVICE AND WIND POWER GENERATION SYSTEM

CROSS-REFERENCE TO RELATED APPLICATIONS

This application is based upon and claims the benefit of priority from the prior Japanese Application No. 2014-226218 filed on Nov. 6, 2014, and the prior Japanese Application No. 2015-143783 filed on Jul. 21, 2015; the entire contents of all of which are incorporated therein by reference.

FIELD

Embodiments described herein relate generally to an airflow generation device and a wind power generation system.

BACKGROUND

A wind power generation system generates power by utilizing wind power energy being renewable energy. In the wind power generation system, when a wind speed and a wind direction suddenly fluctuate, a speed triangle around a windmill blade greatly deviates from a rating point, so that a separated flow sometimes occurs in a wide range. When the wind speed and the wind direction suddenly fluctuate, it is not easy to sufficiently respond to the fluctuations by adjustment of a yaw angle or a pitch angle. As a result of this, in the wind power generation system, there may be cases where it is difficult to keep a power generation output to a stable one, and it is not easy to increase an efficiency. In particular, in a region having a mountain climate such as in Japan, a wind speed and a wind direction change greatly, so that a power generation output cannot be kept stably, and thus it is not easy to increase an efficiency. Other than the above, when a wind power generation system is installed at a place near a private house and the like, a generation of noise sometimes becomes a problem.

As a measure for the above, it has been proposed to use an airflow generation device to generate an airflow at a surface of a windmill blade. The airflow generation device has a main body to which a pair of electrodes are provided via a dielectric, and the main body is disposed on a surface of a windmill blade. Further, the airflow generation device generates an airflow when a voltage application unit (discharge power supply) applies a voltage between the pair of electrodes to generate a plasma. For example, a pulse modulation frequency is set in accordance with a rotation speed of a windmill blade detected by a rotation speed detecting unit (rotation speed sensor), and a high-frequency voltage which is pulse-modulated by the set pulse modulation frequency is applied between the pair of electrodes. By generating the airflow using the airflow generation device as described above, it is possible to control a flow of a fluid at the surface of the windmill blade to suppress an occurrence of separated flow. As a result of this, a lift of the windmill blade increases, and it is possible to realize not only a stabilization of power generation but also an improvement in power generation efficiency. Further, it is possible to suppress a generation of noise.

In a wind power generation system, an application of voltage is performed on a rotary body from a stationary body via a slip ring, for example.

In a wind power generation system, a voltage application unit (discharge power supply) is mounted on a rotary body such as a windmill blade so that a high voltage is not supplied to a main body of an airflow generation device via a slip ring, by taking efficiency and safety into consideration. In this case, data of rotation speed detected by a rotation speed detecting unit (rotation speed sensor) disposed on a stationary body such as a nacelle is transmitted to the voltage application unit disposed on the rotary body via the slip ring. For this reason, a malfunction sometimes occurs due to a noise caused by the slip ring. Further, since a number of poles of the slip ring increases, there is a case where it becomes difficult to dispose the airflow generation device in an existing wind power generation system, in particular.

Therefore, a problem to be solved by the present invention is to provide an airflow generation device, and a wind power generation system capable of suppressing an increase in a number of poles of a slip ring, and effectively preventing a malfunction from occurring due to a generation of noise caused by the slip ring.

DETAILED DESCRIPTION

An airflow generation device of an embodiment has a main body, a rotation speed detecting unit, and a voltage application unit. The main body has a first electrode and a second electrode provided to a base formed of a dielectric, and is disposed on a rotary body. The rotation speed detecting unit detects a rotation speed of the rotary body. The voltage application unit generates an airflow by applying a voltage between the first electrode and the second electrode based on the rotation speed detected in the rotation speed detecting unit. Here, the voltage application unit and the rotation speed detecting unit are disposed in the rotary body.

Embodiments will be described with reference to the drawings.

[Configuration of Wind Power Generation System 1]

Figure 1:
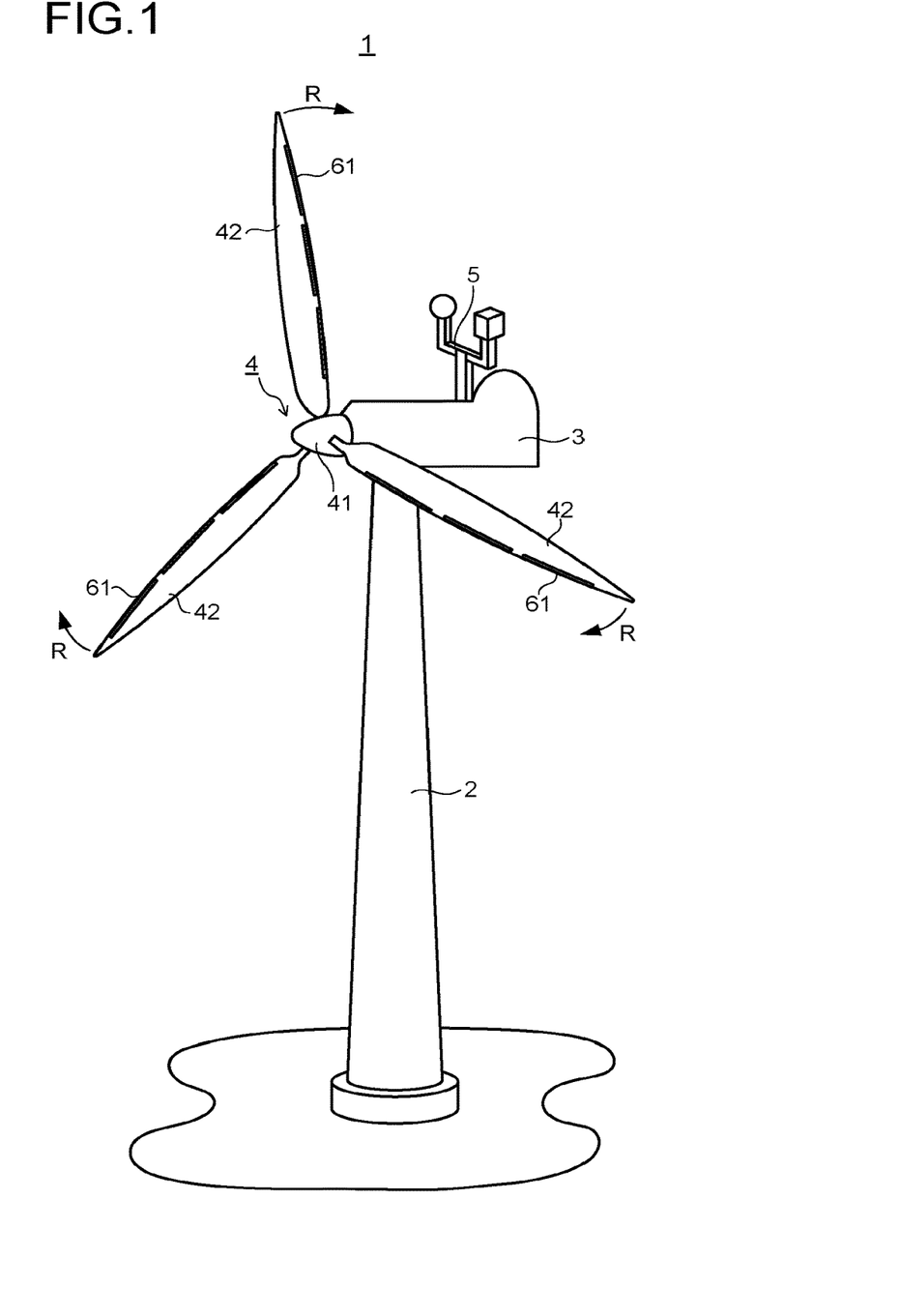
FIG. 1 is a perspective view schematically illustrating an entire configuration of a wind power generation system according to an embodiment.

FIG. 1 is a perspective view schematically illustrating an entire configuration of a wind power generation system according to an embodiment.

A wind power generation system 1 is, for example, an up-wind type propeller windmill, and includes a tower 2, a nacelle 3, a rotor 4, and an aerovane unit 5, as illustrated in FIG. 1.

In the wind power generation system 1, the tower 2 extends along a vertical direction, and a lower end portion thereof is fixed to a base (whose illustration is omitted) embedded in the ground.

In the wind power generation system 1, the nacelle 3 is disposed at an upper end portion of the tower 2. The nacelle 3 is supported to be rotatable about an axis in the vertical direction at the upper end portion of the tower 2, in order to adjust a yaw angle. Although the illustration is omitted, a speed-increasing gear and a power generator are housed inside the nacelle 3.

In the wind power generation system 1, the rotor 4 is supported to be rotatable at one side end portion of the nacelle 3, and rotates in a rotational direction R with a horizontal direction set as a rotational axis, for example. The rotor 4 is coupled to a rotary shaft of the speed-increasing gear housed inside the nacelle 3, and the power generator is driven via the speed-increasing gear to conduct power generation. Here, the rotor 4 includes a hub 41 and a plurality of windmill blades 42 (blades).

In the rotor 4, the hub 41 includes a tip cover whose outer shape is a semiellipsoidal shape, and the tip cover is formed to have an outside diameter of an outer peripheral surface which increases from a windward side to a leeward side in a horizontal direction.

In the rotor 4, the plurality of windmill blades 42 respectively extend in a radial direction around the hub 41, and are respectively disposed so as to be arranged at equal intervals in the rotational direction R. For example, three windmill blades 42 are provided, and each of the blades has one end supported to be rotatable on the hub 41, in order to adjust a pitch angle.

Further, in each of the plurality of windmill blades 42, a plurality of main bodies 61 of the airflow generation devices 6 to be described later are disposed so as to be arranged side by side in a blade span direction, as illustrated in FIG. 1. Details of the airflow generation device 6 will be described later.

In the wind power generation system 1, the aerovane unit 5 is attached to an upper surface of the nacelle 3, at the leeward side of the windmill blade 42. The aerovane unit 5 conducts measurement regarding a wind speed and a wind direction, and outputs data obtained by the measurement to a control unit (whose illustration is omitted). Here, the control unit is configured to make an arithmetic element perform arithmetic processing by using a program stored in a memory device, and the adjustment of the yaw angle and the pitch angle is conducted in accordance with the measured data input as above.

[Configuration of Airflow Generation Device 6]

Figure 2:
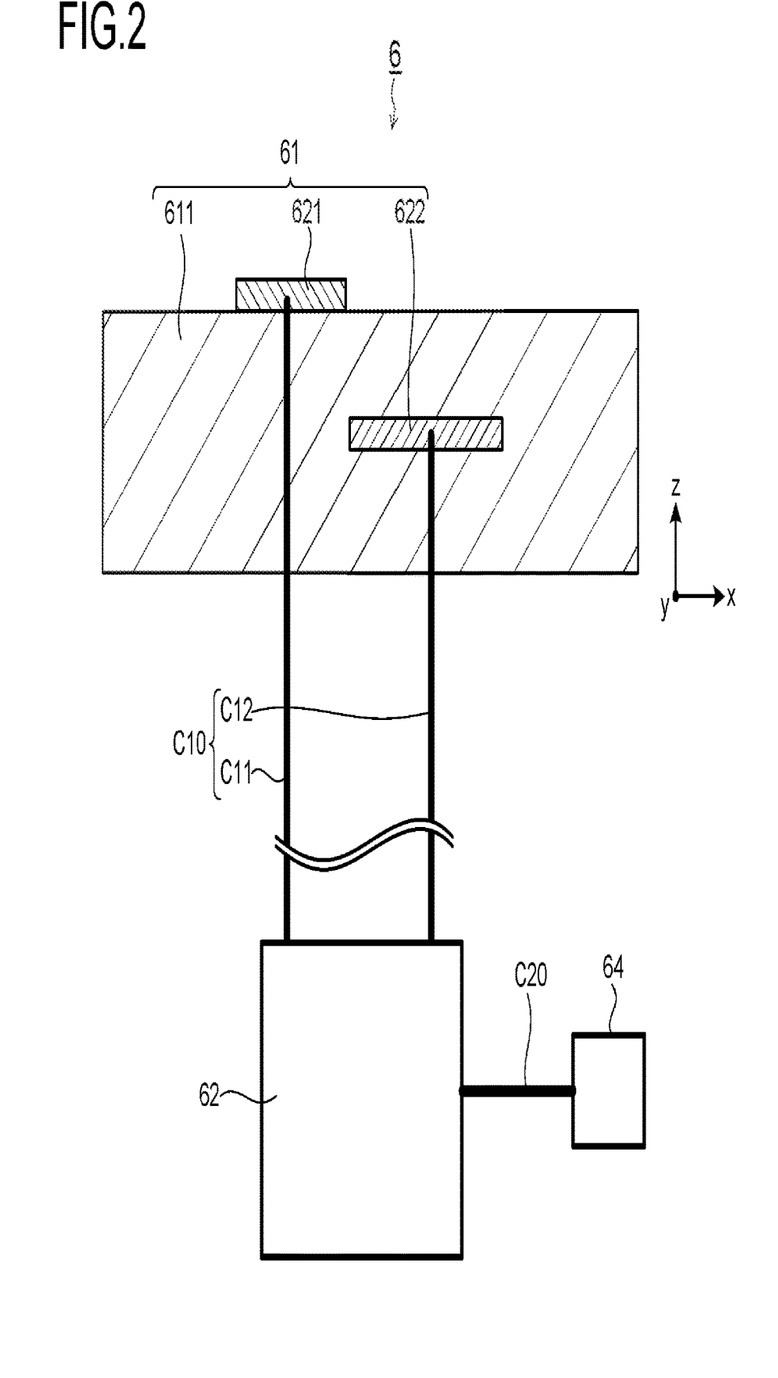
FIG. 2 is a view schematically illustrating an airflow generation device in the wind power generation system according to the embodiment.
Figure 3:
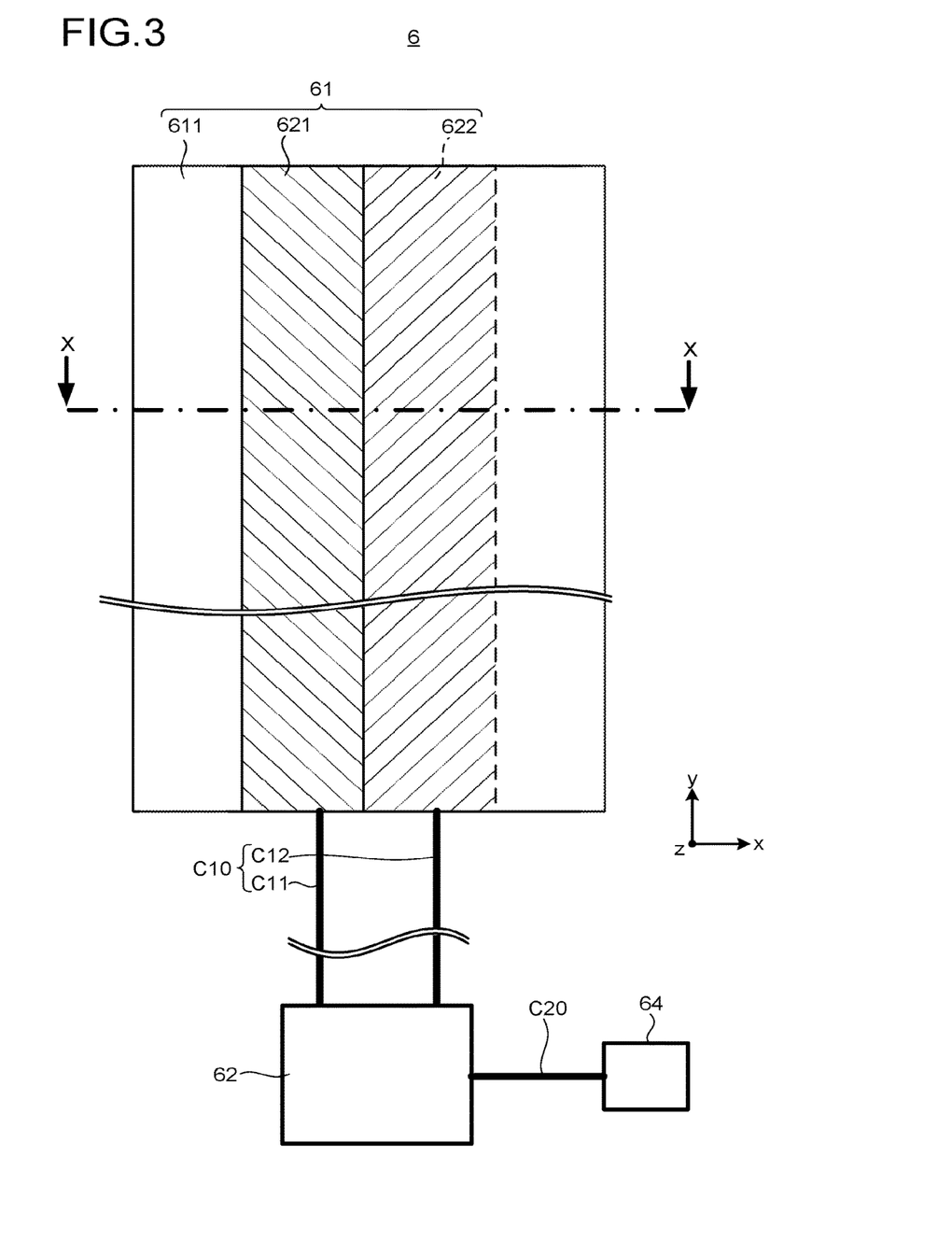
FIG. 3 is a view schematically illustrating the airflow generation device in the wind power generation system according to the embodiment.

FIG. 2 and FIG. 3 are views each schematically illustrating the airflow generation device 6 in the wind power generation system 1 according to the embodiment. FIG. 2 illustrates a cross section of the main body 61 in the airflow generation device 6. Further, FIG. 3 illustrates an upper surface of the main body 61 in the airflow generation device 6. FIG. 2 illustrates a cross section of an X-X portion in FIG. 3. Further, in FIG. 3, a contour of a member disposed inside, out of members that form the main body 61, is indicated by a dotted line.

Figure 4:
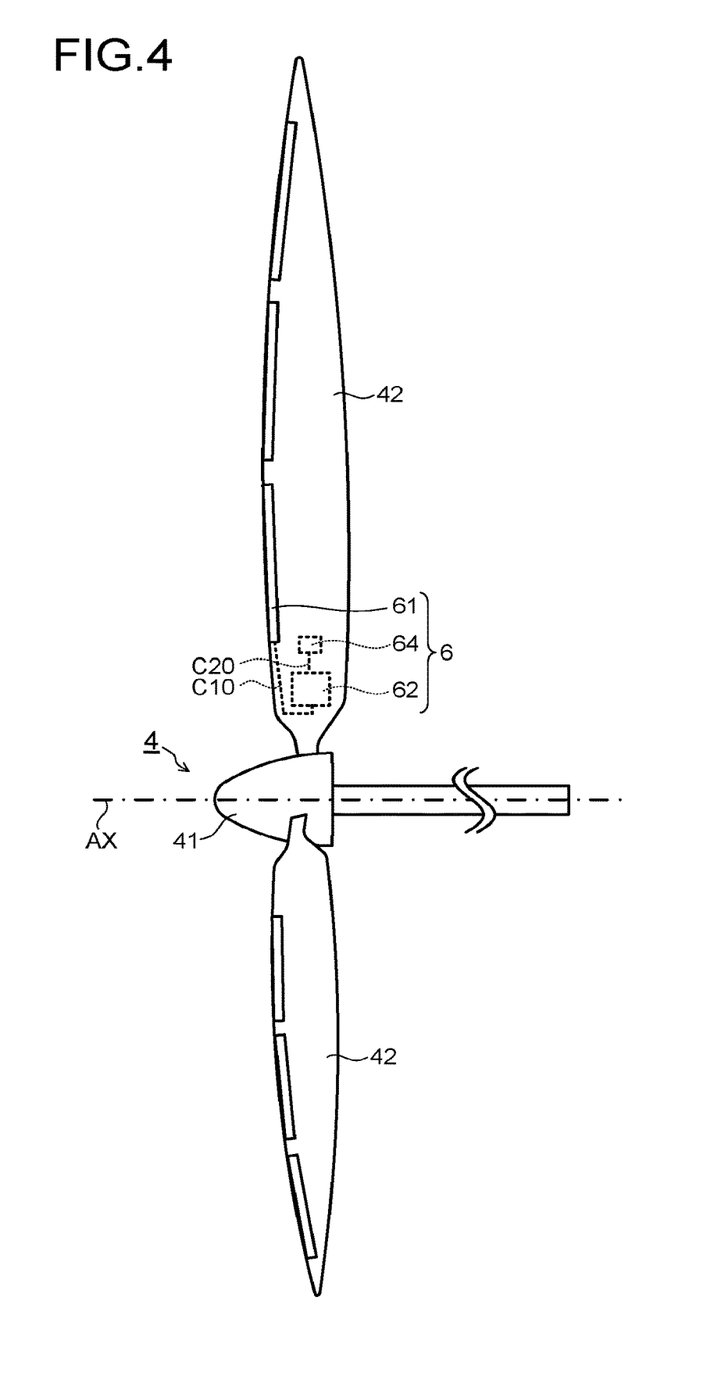
FIG. 4 is a view illustrating a state where composing members of the airflow generation device are disposed in the wind power generation system according to the embodiment.

Further, FIG. 4 is a diagram illustrating a state where composing members of the airflow generation device 6 are disposed in the wind power generation system 1 according to the embodiment. FIG. 4 illustrates a substantial part of a side surface of the rotor 4 (refer to FIG. 1). Further, in FIG. 4, a contour of a member disposed inside is indicated by a dotted line.

The airflow generation device 6 includes the main body 61, a voltage application unit 62, and a rotation speed detecting unit 64, as illustrated in FIG. 2, FIG. 3, and FIG. 4.

Respective parts which form the airflow generation device 6 will be described in order.

(Main Body 61)

As illustrated in FIG. 2 and FIG. 3, the main body 61 in the airflow generation device 6 includes a base 611, a first electrode 621, and a second electrode 622.

In the main body 61, the base 611 is formed of an insulating material (dielectric). For example, the base 611 is formed by using a resin such as a silicone resin (silicone rubber), a polyimide resin, an epoxy resin, or a fluorocarbon resin, and is flexible.

In the main body 61, the first electrode 621 is a plate-shaped body, and is formed of a conductive material such as a metal material. As illustrated in FIG. 2, the first electrode 621, being a front surface electrode provided on a front surface (upper surface) of the base 611, linearly extends as illustrated in FIG. 3.

In the main body 61, the second electrode 622 is a plate-shaped body, and is formed of a conductive material such as a metal material, in a similar manner to the first electrode 621. As illustrated in FIG. 2, the second electrode 622, being an internal electrode, is different from the first electrode 621, and is provided inside the base 611. As illustrated in FIG. 3, the second electrode 622 linearly extends in a direction (vertical direction in FIG. 3) same as an extending direction in which the first electrode 621 extends (first direction, longitudinal direction). Here, the second electrode 622 is disposed to be arranged side by side with the first electrode 621 in a direction (second direction) (horizontal direction in FIG. 3) orthogonal to the extending direction of the first electrode 621 (first direction).

The main body 61 is formed through various types of processing such as presswork and extrusion-forming work, for example.

As illustrated in FIG. 4, the main body 61 is disposed on the windmill blade 42 being a rotary body. Here, the main body 61 is bonded to the windmill blade 42 so that its surface (lower surface) positioned on an opposite side of its front surface (upper surface) on which the first electrode 621 is provided, closely adheres to the surface of the windmill blade 42 (refer to FIG. 2). For example, the main body 61 is disposed on a portion of leading edge side of a surface on a blade back side (upper surface) in the windmill blade 42, so that the first electrode 621 and the second electrode 622 are sequentially arranged from the leading edge to a trailing edge. Further, the main body 61 is disposed so that the extending direction of the first electrode 621 and the second electrode 622 (first direction) is along the blade span (blade width) direction.

(Voltage Application Unit 62)

In the airflow generation device 6, the voltage application unit 62 (discharge power supply) is electrically connected to the main body 61 via a connecting part C10, as illustrated in FIG. 2 and FIG. 3. Here, the connecting part C10 includes a pair of connecting wires C11 and C12, and electrically connects between the first electrode 621 and the voltage application unit 62, and between the second electrode 622 and the voltage application unit 62. Concretely, in the connecting part C10, one connecting wire C11 has one end electrically connected to the first electrode 621, and the other end electrically connected to the voltage application unit 62. Further, in the connecting part C10, the other connecting wire C12 has one end electrically connected to the second electrode 622, and the other end electrically connected to the voltage application unit 62.

As illustrated in FIG. 4, the voltage application unit 62 is disposed in the windmill blade 42 being the rotary body. In the present embodiment, the voltage application unit 62 is disposed inside the windmill blade 42, at a portion on a blade root side, for example. Although the illustration is omitted, there are disposed a plurality of voltage application units 62 so that each of the units applies a voltage independently to each of the plurality of main bodies 61 disposed on one windmill blade 42 (refer to FIG. 1 and FIG. 4). Note that it is preferable that the plurality of voltage application units 62 are disposed so that a center of gravity of the plurality of voltage application units 62, as a whole, disposed on each of the plurality of windmill blades 42, coincides with a rotational axis of the rotor 4 (refer to FIG. 1).

The voltage application unit 62 applies, via the connecting part C10, a voltage between the first electrode 621 and the second electrode 622 provided to the main body 61. In the present embodiment, the voltage application unit 62 performs the application of voltage based on a rotation speed detected by the rotation speed detecting unit 64.

Concretely, a direct-current voltage converted from an alternating voltage of commercial frequency by an AC/DC converter, for example, is supplied to the voltage application unit 62 from a side of a stationary body such as the nacelle 3, via a slip ring. Further, in the voltage application unit 62, a high-frequency generator (inverter) generates an alternating voltage of high frequency (1 to 20 kHz, for example) from the direct-current voltage, and then the high-frequency alternating voltage is boosted (to several kV, for example) by a transformer.

Further, in the voltage application unit 62, the boosted high-frequency alternating voltage is pulse-modulated by a pulse modulator using a low-frequency pulse modulation wave. Here, in the voltage application unit 62, an arithmetic element first sets a pulse modulation frequency F of the pulse modulation wave, based on a rotation speed n (rpm) detected by the rotation speed detecting unit 64.

Concretely, the pulse modulation frequency F is set by performing arithmetic processing by using not only the rotation speed n (rpm) detected by the rotation speed detecting unit 64, but also a previously set Strouhal number St, a chord length Cn (m) of the windmill blade 42, and a radius of rotation Rn of the windmill blade 42, as represented by the following expression (A). Here, in the above-described expression (A), Cn is set to indicate a chord length of a portion at which a center (center in the extending direction of the first electrode 621 and the second electrode 622) of each of the plurality of main bodies 61 is positioned in the windmill blade 42, Rn is set to indicate a distance between a center of each of the plurality of main bodies 61 in a span direction of the windmill blade 42 and a rotational axis AX (rotation center), and the setting of the pulse modulation frequency F is conducted for each of the plurality of main bodies 61.

$$F=(2\pi n/60) \times St \times Cn \times Rn \quad (A)$$

Further, the high-frequency alternating voltage is pulse-modulated by using the pulse modulation wave of the set pulse modulation frequency F. Thereafter, the voltage application unit 62 applies the pulse-modulated high-frequency alternating voltage between the first electrode 621 and the second electrode 622.

Figure 5:
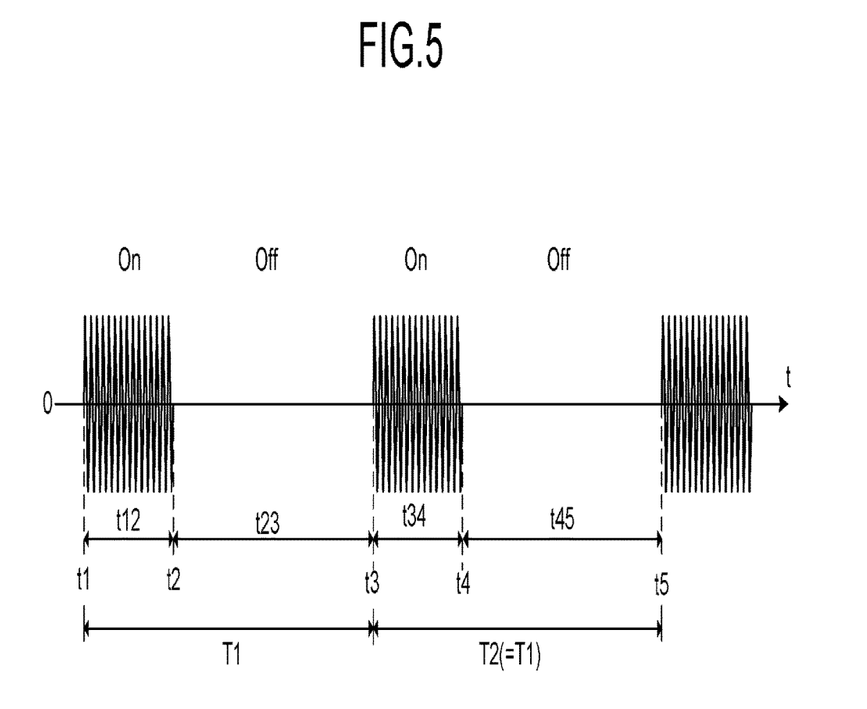
FIG. 5 illustrates a waveform of a voltage applied by a voltage application unit in the airflow generation device in the wind power generation system according to the embodiment.

FIG. 5 illustrates a waveform of a voltage applied by the voltage application unit 62 in the airflow generation device 6 in the wind power generation system 1 according to the embodiment. In FIG. 5, a horizontal axis indicates a time, and a vertical axis indicates a value of the voltage.

As illustrated in FIG. 5, the voltage application unit 62 applies a high-frequency voltage (alternating voltage) between the first electrode 621 and the second electrode 622, at a previously set frequency (fundamental frequency). The high-frequency voltage is pulse-modulated by a pulse modulation wave (whose illustration is omitted) having a frequency which is lower than that of the high-frequency voltage, and is applied in each period of the pulse modulation wave (T1, T2, . . . =1/F).

Concretely, in a first period T1, an application of voltage is started at a first time point t1. Further, during a time t12 from the first time point t1 to a second time point t2 (first on-time), a voltage is applied at a previously set frequency (fundamental frequency), which generates an airflow. Specifically, the voltage whose polarity changes to a positive one and to a negative one is repeatedly applied in a periodic manner, in accordance with the time. Thereafter, during a time t23 from the second time point t2 to a third time point t3 (first off-time), the application of voltage is stopped, to thereby stop the generation of airflow (T1=t12+t23).

Further, in a second period T2 (=T1), a high-frequency voltage is applied, in a similar manner to the case of the first period T1. Specifically, the application of voltage is started at the third time point t3. Further, during a time t34 from the third time point t3 to a fourth time point t4 (second on-time), a high-frequency voltage is applied at a previously set frequency (fundamental frequency), in a similar manner to the first period T1, resulting in that an airflow is generated. The time t34 during which the airflow is generated in the second period T2 (second on-time) is the same as the time t12 during which the airflow is generated in the first period T1 (first on-time). Thereafter, during a time t45 from the fourth time point t4 to a fifth time point t5 (second off-time), the application of high-frequency voltage is stopped, resulting in that the generation of airflow is stopped (T2=t34+t45).

Although the illustration is omitted, also in a period after the second period T2 (a third period or thereafter), an application of voltage is conducted in a similar manner to the case of the first period T1 and the second period T2.

By the application of voltage, on the front surface (upper surface) of the main body 61, a plasma due to a barrier discharge is generated, and an airflow (plasma-induced flow) is induced. The airflow is induced so as to flow from the first electrode 621 side to the second electrode 622 side, resulting in that the occurrence of separated flow is suppressed.

(Rotation Speed Detecting Unit 64)

In the airflow generation device 6, the rotation speed detecting unit 64 (rotation speed sensor) is electrically connected to the voltage application unit 62 via a connecting part C20 including a signal line, as illustrated in FIG. 2 and FIG. 3. Although the illustration is omitted, the rotation speed detecting unit 64 is electrically connected to each of the plurality of voltage application units 62 disposed to correspond to each of the plurality of main bodies 61 disposed on one windmill blade 42 (refer to FIG. 1 and FIG. 4). Further, an electric power is supplied to the rotation speed detecting unit 64 from the voltage application unit 62, for example.

As illustrated in FIG. 4, the rotation speed detecting unit 64 is disposed in the windmill blade 42 being the rotary body. In the present embodiment, the rotation speed detecting unit 64 is disposed inside the windmill blade 42, at a portion on the blade root side, for example, in a similar manner to the voltage application unit 62.

The rotation speed detecting unit 64 detects a rotation speed of the rotor 4 including the windmill blade 42, and outputs a data signal of the detected rotation speed to the voltage application unit 62, in real time, via the connecting part C20.

In the present embodiment, the rotation speed detecting unit 64 includes an acceleration sensor formed by using a semiconductor, for example. In the rotation speed detecting unit 64, the acceleration sensor detects an acceleration in an axis along the vertical direction. Further, the rotation speed detecting unit 64 determines the rotation speed of the rotor 4 when an arithmetic element performs arithmetic processing regarding the acceleration detected by the acceleration sensor. The acceleration sensor has a small size, and thus is easily disposed.

Figure 6:
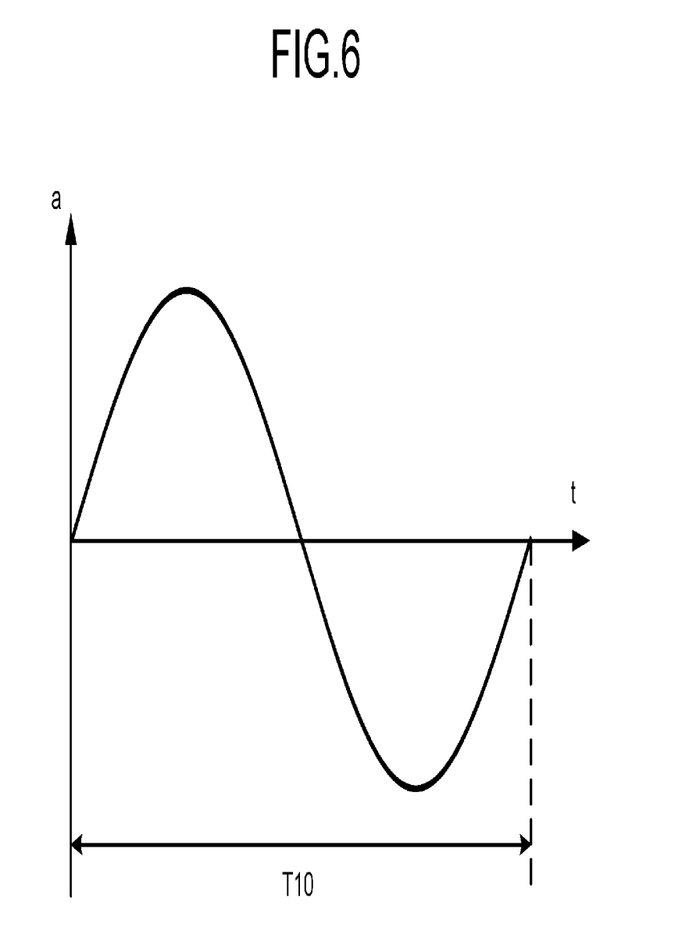
FIG. 6 is a view illustrating data when an acceleration sensor which forms a rotation speed detecting unit detects an acceleration in the airflow generation device in the wind power generation system according to the embodiment.

FIG. 6 is a view illustrating data when the acceleration sensor which forms the rotation speed detecting unit 64 detects an acceleration, in the airflow generation device 6 in the wind power generation system 1 according to the embodiment. In FIG. 6, a horizontal axis indicates a time t, and a vertical axis indicates an acceleration a. FIG. 6 illustrates a state where the rotor 4 is rotated by one turn.

As illustrated in FIG. 6, when the rotor 4 is rotated by one turn, the acceleration a changes so as to draw a sine curve, in accordance with the time t. Accordingly, it is possible to determine a rotation speed per unit time (rpm), through conversion, from a time T10 when the rotor 4 is rotated by one turn (namely, a period).

[Operations and Effects]

As described above, in the present embodiment, the voltage application unit 62 (discharge power supply) is disposed in the windmill blade 42 being the rotary body. Along with this, the rotation speed detecting unit 64 is disposed in the windmill blade 42 being the rotary body. Accordingly, in the present embodiment, the data of the rotation speed detected by the rotation speed detecting unit 64 disposed in the rotary body is transmitted to the voltage application unit 62 disposed in the rotary body, without an intervention of the slip ring.

Therefore, in the present embodiment, it is possible to prevent the malfunction from occurring due to the noise caused by the slip ring. Further, in the present embodiment, it is possible to prevent the increase in the number of poles of the slip ring. As a result of this, it becomes easy to dispose the airflow generation device 6 in the existing wind power generation system 1.

Modified Example

Although the above-described embodiment describes a case where both of the voltage application unit 62 (discharge power supply) and the rotation speed detecting unit 64 are disposed in the windmill blade 42 of the rotor 4, the present invention is not limited to this. For example, it is also possible to dispose the units in the hub 41 of the rotor 4.

Although the above-described embodiment describes a case where the direct-current voltage is supplied to the voltage application unit 62 from the stationary body side via the slip ring, the present invention is not limited to this. It is also possible to configure such that the direct-current voltage is supplied to the voltage application unit 62 through a wireless power supply.

Although the above-described embodiment describes a case where the rotation speed detecting unit 64 detects the rotation speed by using the acceleration sensor, the present invention is not limited to this. For example, it is also possible that the rotation speed detecting unit 64 is configured to detect the rotation speed by using an optical-fiber sensor. Specifically, it is also possible to detect the rotation speed based on a variation of characteristics of light which passes through the optical-fiber sensor, caused by the rotation. It is also possible to configure such that the rotation speed detecting unit 64 detects the rotation speed, through various methods other than the above.

In the above-described embodiment, the rotation speed detecting unit 64 is disposed inside the windmill blade 42, at the portion on the blade root side, in a similar manner to the voltage application unit 62. Further, in the above-described embodiment, the rotation speed detecting unit 64 detects the rotation speed of the rotor 4 including the windmill blade 42, and outputs the data signal of the detected rotation speed to the voltage application unit 62, in real time, via the connecting part C20. However, the configuration of the present invention is not limited to such configuration.

Figure 7:
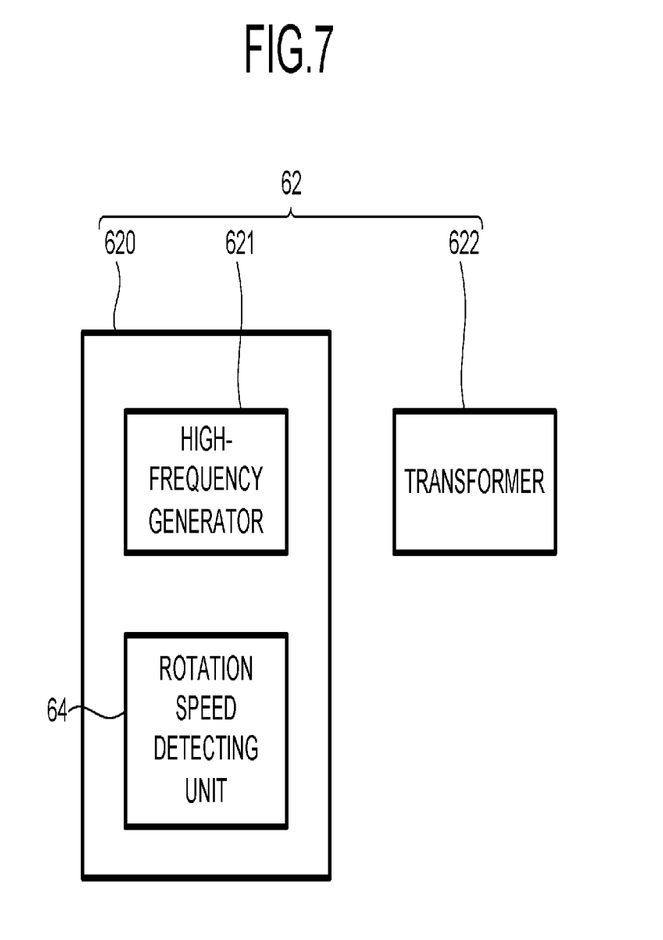
FIG. 7 is a block diagram schematically illustrating substantial parts of the voltage application unit and the rotation speed detecting unit in a modified example of the embodiment.

FIG. 7 is a block diagram schematically illustrating substantial parts of the voltage application unit 62 and the rotation speed detecting unit 64 in a modified example of the embodiment.

It is also possible to configure such that, as illustrated in FIG. 7, the voltage application unit 62 (discharge power supply) includes a casing 620, a composing member such as a high-frequency generator 621 is housed inside the casing 620, and the rotation speed detecting unit 64, which is not the composing member of the voltage application unit 62, is further housed inside the casing 620. Out of the composing members of the voltage application unit 62, a transformer 622 may become a noise source, and thus is preferably disposed at a position outside the casing 620. Further, the casing 620 of the voltage application unit 62 is preferably formed of metal. This makes it possible to prevent a change of signal caused when the connecting part C20 receives an electrical noise at the time of transmitting the signal from the rotation speed detecting unit 64 to the voltage application unit 62.

Further, in the above-described embodiment, the connecting part C20 is used for transmitting the signal from the rotation speed detecting unit 64 to the voltage application unit 62, but, the present invention is not limited to this. It is also possible to configure to give and receive signals between the rotation speed detecting unit 64 and the voltage application unit 62 by wireless. Specifically, it is also possible to configure such that the above-described signal transmission is conducted by wireless. This makes it possible to prevent a change of signal caused when the connecting part C20 receives an electrical noise at the time of transmitting the signal from the rotation speed detecting unit 64 to the voltage application unit 62.

According to at least one embodiment described above, by disposing the voltage application unit and the rotation speed detecting unit in the rotary body, it is possible to suppress the increase in the number of poles of the slip ring, and to effectively prevent the malfunction from occurring due to the generation of noise caused by the slip ring.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An airflow generation device, comprising:
a main body having a base formed of a dielectric, a first electrode and a second electrode, the first electrode and the second electrode being provided inside the base, the main body being disposed on a rotary body;
a rotation speed detecting unit for detecting a rotation speed of the rotary body; and
a voltage application unit for generating an airflow by applying a voltage between the first electrode and the second electrode based on the rotation speed detected in the rotation speed detecting unit,
wherein the voltage application unit and the rotation speed detecting unit are disposed inside the rotary body.

2. The airflow generation device according to claim 1, wherein the rotation speed detecting unit has an acceleration sensor.

3. The airflow generation device according to claim 1, wherein the voltage application unit applies a pulse-modulated voltage modulated by a pulse modulation frequency set in accordance with the rotation speed detected by the rotation speed detecting unit, between the first electrode and the second electrode.

4. The airflow generation device according to claim 1, wherein:
the rotary body has windmill blade; and
the windmill blade is provided with each of the main body, the rotation speed detecting unit, and the voltage application unit.

5. The airflow generation device according to claim 1, wherein the rotation speed detecting unit is disposed inside a casing which forms the voltage application unit.

6. The airflow generation device according to claim 1, wherein signals are given and received between the rotation speed detecting unit and the voltage application unit by wireless.

7. A wind power generation system, comprising
a rotary body to which windmill blade is disposed, and airflow generation device configured to generate an airflow at a surface of the windmill blade,
wherein the airflow generation device has:
a main body having a base formed of an insulating material, a first electrode and a second electrode, the first electrode and the second electrode being provided inside the base, the main body being disposed on a surface of the windmill blade;
a rotation speed detecting unit configured to detect a rotation speed of the rotary body; and
a voltage application unit configured to generate an airflow by applying a voltage between the first electrode and the second electrode based on the rotation speed detected in the rotation speed detecting unit,
wherein the voltage application unit and the rotation speed detecting unit are disposed inside the rotary body.

8. The airflow generation device according to claim 2, wherein the voltage application unit applies a pulse-modulated voltage modulated by a pulse modulation frequency set in accordance with the rotation speed detected by the rotation speed detecting unit, between the first electrode and the second electrode.

* * * * *